(12) United States Patent
Kayama et al.

(10) Patent No.: US 12,488,203 B2
(45) Date of Patent: Dec. 2, 2025

(54) DIARY GENERATION DEVICE, DIARY GENERATION SYSTEM, DIARY GENERATION METHOD, AND PROGRAM

(71) Applicant: LIFE QUEST Inc., Tokyo (JP)

(72) Inventors: Tetsu Kayama, Tokyo (JP); Takuma Fukuda, Tokyo (JP)

(73) Assignee: LIFE QUEST INC., Tokyo (JP)

( * ) Notice: Subject to any disclaimer, the term of this patent is extended or adjusted under 35 U.S.C. 154(b) by 0 days.

(21) Appl. No.: 18/246,652

(22) PCT Filed: Sep. 25, 2020

(86) PCT No.: PCT/JP2020/036489
§ 371 (c)(1),
(2) Date: Mar. 24, 2023

(87) PCT Pub. No.: WO2022/064664
PCT Pub. Date: Mar. 31, 2022

(65) Prior Publication Data
US 2023/0274099 A1    Aug. 31, 2023

(51) Int. Cl.
*G06F 40/56* (2020.01)
*A61B 5/16* (2006.01)

(52) U.S. Cl.
CPC .............. *G06F 40/56* (2020.01); *A61B 5/165* (2013.01)

(58) Field of Classification Search
CPC ...................................................... G06F 40/56
(Continued)

(56) References Cited

U.S. PATENT DOCUMENTS

| | | | |
|---|---|---|---|
| 2003/0056252 A1* | 3/2003 | Ota | A63H 11/00 700/245 |
| 2004/0172447 A1* | 9/2004 | Miller | G16H 10/20 709/203 |

(Continued)

FOREIGN PATENT DOCUMENTS

| | | |
|---|---|---|
| JP | 3075733 U | 3/2001 |
| JP | 2002-215611 A | 8/2002 |

(Continued)

OTHER PUBLICATIONS

J. Liao, Z. Wang, L. Wan, Q. C. Cao and H. Qi, "Smart Diary: A Smartphone-Based Framework for Sensing, Inferring, and Logging Users' Daily Life," in IEEE Sensors Journal, vol. 15, No. 5, pp. 2761-2773, May 2015, doi: 10.1109/JSEN.2014.2331970. (Year: 2015) (Year: 2015).*

(Continued)

*Primary Examiner* — Bharatkumar S Shah
(74) *Attorney, Agent, or Firm* — MASUVALLEY & PARTNERS; Peter Martinez

(57) ABSTRACT

The present invention makes it easy to generate a diary. In a diary generation system (1), a terminal device (3) transmits a diary creation request including usage history of the terminal device (3) to a server device (4) via a network (N). In response to receiving the diary creation request transmitted from the terminal device (3) via the network (N), the server device (4) identifies a user's activities from the usage history of the terminal device (3) included in the diary creation request. The server device (4) then writes sentences in a prescribed order to generate a diary, and causes, via the network (N), the terminal device (3) to display the diary.

6 Claims, 10 Drawing Sheets

(58) Field of Classification Search
USPC .......................................................... 704/9
See application file for complete search history.

(56) References Cited

U.S. PATENT DOCUMENTS

| | | | | |
|---|---|---|---|---|
| 2006/0235926 | A1* | 10/2006 | Naruse | H04L 51/58 707/E17.116 |
| 2010/0029294 | A1* | 2/2010 | Matsuoka | H04L 67/04 455/563 |
| 2012/0089417 | A1* | 4/2012 | Bardy | G16H 40/67 600/509 |
| 2014/0005499 | A1* | 1/2014 | Catt | G16H 20/40 600/301 |
| 2015/0168162 | A1* | 6/2015 | Subramanian | G01C 21/30 701/523 |
| 2015/0169659 | A1* | 6/2015 | Lee | G06Q 10/10 707/746 |
| 2017/0235848 | A1* | 8/2017 | Van Dusen | G06Q 30/0201 705/12 |
| 2018/0157763 | A1* | 6/2018 | Lays | G06F 16/972 |
| 2024/0215911 | A1* | 7/2024 | Serackis | A61B 5/486 |
| 2024/0371510 | A1* | 11/2024 | Aman | G16H 40/63 |

FOREIGN PATENT DOCUMENTS

| | | |
|---|---|---|
| JP | 2006-301884 A | 11/2006 |
| JP | 2008-003655 A | 1/2008 |
| JP | 2008-257358 A | 10/2008 |
| JP | 2009-026098 A | 2/2009 |
| JP | 2012-242862 A | 12/2012 |
| JP | 2014-067122 A | 4/2014 |

OTHER PUBLICATIONS

J. Liao, Z. Wang, L. Wan, ©. C. Cao and H. Qi, "Smart Diary: A Smartphone-Based Framework for Sensing, Inferring, and Logging Users' Daily Life," in IEEE Sensors Journal, vol. 15, No. 5, pp. 2761-2773, May 2015, doi: 10.1109/JSEN.2014.2331970. (Year: 2015) (Year: 2015).*

J. Liao, Z. Wang, L. Wan, ©. C. Cao and H. Qi, "Smart Diary: A Smartphone-Based Framework for Sensing, Inferring, and Logging Users' Daily Life," in IEEE Sensors Journal, vol. 15, No. 5, pp. 2761-2773, May 2015, doi: 10.1109/JSEN.2014.2331970. (Year: 2015) (Year: 2015) (Year: 2015) (Year: 2015).*

A. Ghosh, E. A. Stepanov, M. Danieli and G. Riccardi, "Are you stressed? Detecting high stress from user diaries," 2017 8th IEEE International Conference on Cognitive Infocommunications (CogInfoCom), Debrecen, Hungary, 2017, pp. 000265-000270, doi: 10.1109/CogInfoCom.2017.8268254. keywords: {Stress:T (Year: 2017).*

WIPO, Japan International Search Authority, International Search Report and Written Opinion (with English translation of both) mailed Dec. 28, 2020 in International Patent Application No. PCT/JP2020/036489, 13 pages.

European Patent Office, Extended European Search Report issued on Oct. 26, 2023 in European Patent Application No. 20955258.7, 10 pages with translation.

\* cited by examiner

11/1 (EMPEROR'S PRIZE)

| TIMES OF DAY | ACTIVITIES | PULSE WAVE | IMPORTANCE |
|---|---|---|---|
| 11:00-12:00 | USE TREATMENT APP | 90 | MIDDLE |
| 12:00-12:45 | BROWSE WEBSITE RELATED TO EMPEROR'S PRIZE | 120 | HIGH |
| 14:00 | GO TO OFF-TRACK BETTING TICKET SALES OFFICE | 121 | HIGH |
| 14:30-15:30 | BROWSE HORSE RACE LIVE BROADCAST | 122 | HIGH |
| 17:00 | GO TO BAR | 90 | LOW |
| 19:00 | GO HOME | 89 | LOW |
| 20:00-20:30 | USE TREATMENT APP | 88 | MIDDLE |
| 21:00-22:00 | BROWSE WEBSITE RELATED TO QUEEN ELIZABETH CUP (11/15) | 100 | HIGH |

FIG. 6

```
NOVEMBER 1ST (SUN) DIARY

I USED TREATMENT APP AGAIN AT LUNCHTIME TODAY,
AND THUS I WAS ABLE TO CONTINUE FOR 151 DAYS.

EVEN SO, I CAN'T STOP THINKING ABOUT EMPEROR'S PRIZE,
MAN!

OF COURSE, I BOUGHT BETTING TICKET AT OFF-TRACK
BETTING TICKET SALES OFFICE, MAN!

BUT, RESULT WAS 4TH, MAN!

AFTER THAT, I WENT HOME AND USED TREATMENT APP.

NEXT, I AM CURIOUS ABOUT HORSES RUNNING IN QUEEN
ELIZABETH CUP!
```

FIG.7

DIARY GENERATION DEVICE, DIARY GENERATION SYSTEM, DIARY GENERATION METHOD, AND PROGRAM

RELATED APPLICATIONS

This application is the U.S. National Phase of and claims priority to International Patent Application No. PCT/JP2020/036489, International Filing Date Sep. 25, 2020, entitled Diary Generation Device, Diary Generation System, Diary Generation Method, And Program; which is incorporated herein by reference in its entirety.

TECHNICAL FIELD

The present invention relates to a diary generation device, a diary generation system, a diary generation method, and a program, and more particularly to a diary generation device, a diary generation system, a diary generation method, and a program capable of easily generating a diary.

BACKGROUND ART

In the treatment of a mental illness such as a gambling addiction, it is effective for patients to keep a diary (see, for example, Patent Document 1). It should be noted that the specification, claims, and drawings of the Patent Document 1 are incorporated herein by reference.

RELATED ART DOCUMENT

Patent Document

Patent Document 1: Utility model registration No. 3075733

SUMMARY OF THE INVENTION

Problems to be Solved by the Invention

However, it was practically quite difficult for the patients to keep the diary continuously, and a possibility of frustration thereof was extremely high.

The present invention is made to solve the above problems, and thus it is an object of the present invention to provide a diary generation device, a diary generation system, a diary generation method, and a program capable of easily generating a diary.

Means of Solving the Problems

In order to achieve the above object, a diary generation device (4) according to a first aspect of the present invention is configured to identify activities of a user of a terminal device (3) from a usage history of the terminal device (3), generate sentences, which respectively express the activities of the user, in accordance with a predetermined rule, and describe the sentences in a predetermined order to generate a diary.

The diary generation device (4) may include an importance table (5) which defines importance of each of the activities of the user, and may be configured to determine the importance of the activity of the user identified from the usage history of the terminal device (3) based on the importance table (5), and determine whether or not to describe the activity of the user in the diary at a different rate depending on the importance of the activity.

The diary generation device (4) may be configured to generate each of the sentences, each of which expresses the activity of the user, in a different style depending on the importance of the activity.

The diary generation device (4) may be configured to change a ratio of each of the sentences, each of which expresses the activity of the user, to the diary depending on the importance of the activity.

The diary generation device (4) may be configured to specify a psychological state of the user from biological information of the user obtained by a biological information measurement device (2) for measuring the biological information of the user, and generate each of the sentences, each of which expresses the activity of the user, in a different style depending on the psychological state of the user.

In response to receiving a diary generation request which is transmitted from the terminal device (3) via a network (N) and includes the usage history of the terminal device (3), the diary generation device (4) may be configured to identify the activities of the user from the usage history of the terminal device (3) included in the diary generation request, generate the sentences, which respectively express the activities of the user, in accordance with the predetermined rule, describe the sentences in the predetermined order to generate the diary, and cause the terminal device (3) to display the diary via the network (N).

A diary generation system (1) according to a second aspect of the present invention comprises: a terminal device (3); and a diary generation device (4) which is connected to the terminal device (3) via a network (N) and is configured to generate a diary of a user of the terminal device (3), wherein the terminal device (3) is configured to transmit a diary generation request including a usage history of the terminal device (3) to the diary generation device (4) via the network (N), wherein in response to receiving the diary generation request transmitted from the terminal device (3) via the network (N), the diary generation device (4) is configured to identify activities of the user from the usage history of the terminal device (3) included in the diary generation request, wherein in accordance with a predetermined rule, the diary generation device (4) is configured to generate sentences, which respectively express the activities of the user, wherein the diary generation device (4) is configured to describe the sentences in a predetermined order to generate a diary, and wherein the diary generation device (4) is configured to cause the terminal device (3) to display the diary via the network (N).

A diary generation method according to a third aspect of the present invention comprising:

identifying activities of a user of a terminal device (3) from a usage history of the terminal device (3), generating sentences, which respectively express the activities of the user, in accordance with a predetermined rule, and describing the sentences in a predetermined order to generate a diary.

A program according to a fourth aspect of the present invention causes a computer to execute a process for identifying activities of a user of a terminal device (3) from a usage history of the terminal device (3), a process for generating sentences, which respectively express the activities of the user, in accordance with a predetermined rule, and a process for describing the sentences in a predetermined order to generate a diary.

Effects of the Invention

According to the present invention, it is possible to provide the diary generation device, the diary generation system, the diary generation method, and the program capable of easily generating a diary.

BRIEF DESCRIPTION OF THE DRAWINGS

FIG. 6 is a diagram showing a configuration example of a diary generation table.

FIG. 7 is a diagram illustrating a diary.

MODE FOR CARRYING OUT THE INVENTION

The following describes the best mode for carrying out the present invention.

First, a configuration of a diary generation system according to an embodiment of the present invention will be described with reference to the drawings.

The diary generation system according to the present embodiment can easily generate a diary for the treatment of a gambling addiction.

Figure 1:
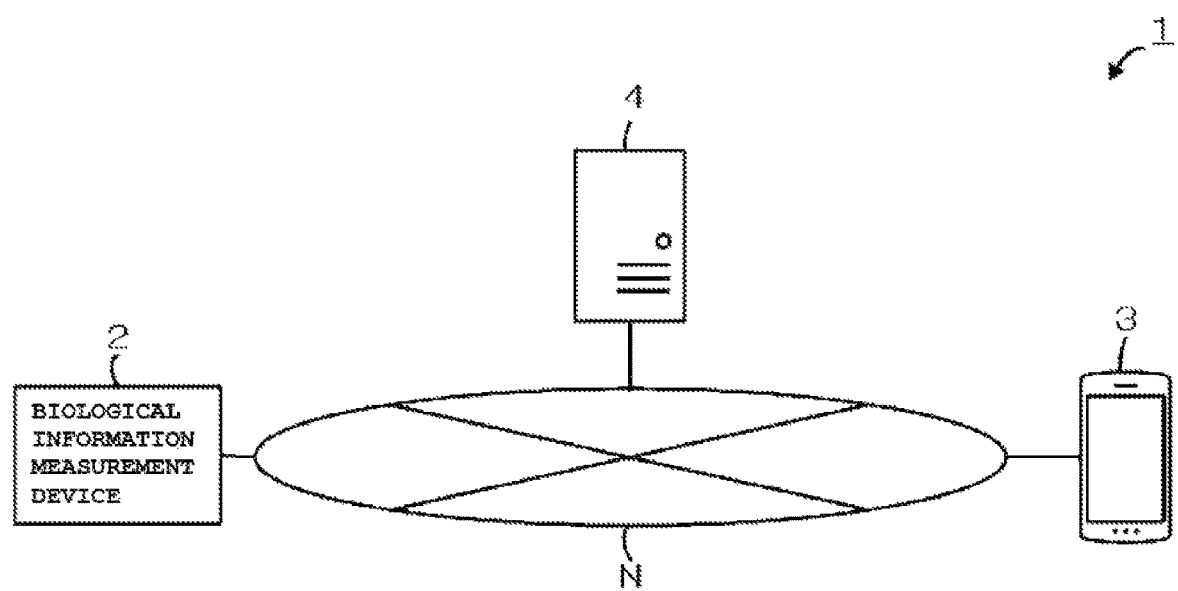
FIG. 1 is a diagram showing a configuration example of a diary generation system according to a present embodiment.

FIG. 1 is a diagram showing a configuration example of a diary generation system according to a present embodiment.

As shown in FIG. 1, the diary generation system 1 includes a biological information measurement device 2, a terminal device 3, and a server device (diary generation device) 4, which are communicatively connected to each other via a network N such as the Internet.

Figure 2:
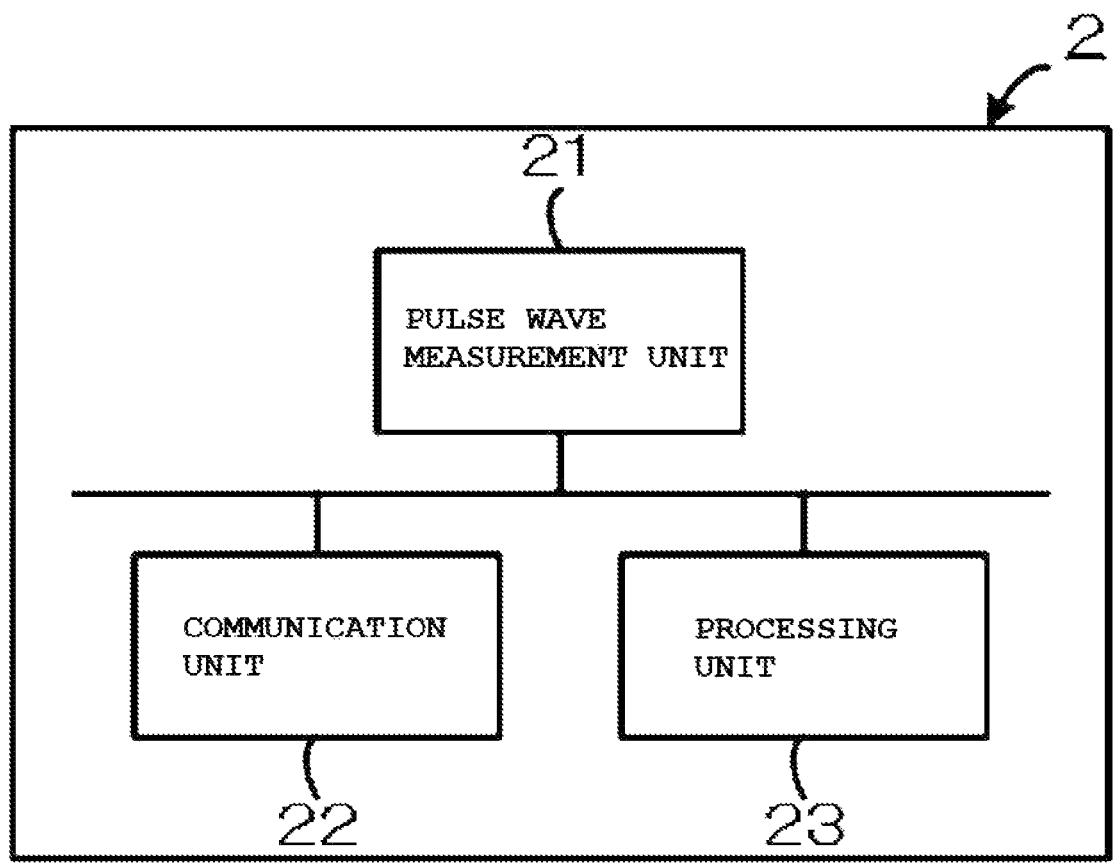
FIG. 2 is a block diagram showing a configuration example of a biological information measurement device.

FIG. 2 is a block diagram showing a configuration example of a biological information measurement device (biological information acquisition device).

As shown in FIG. 2, the biological information measurement device 2 includes a pulse wave measurement unit 21, a communication unit 22, and a processing unit 23.

The pulse wave measurement unit 21 is composed of, for example, an infrared LED (Light Emitting Diode) for emitting infrared rays having a predetermined wavelength (e.g., 940 nm), and an infrared photo register for receiving reflected light of the emitted infrared rays. The pulse wave measurement unit 21 is a wristwatch type device that can be worn on a wrist or the like of a user, and measures the pulse (pulse wave) of the user based on light absorption by hemoglobin in a blood vessel under the skin. Specifically, the pulse wave measurement unit 21 irradiates the skin near the wrist of the user with infrared light from the infrared LED and receives the reflected light by the infrared photo register. Then, the pulse wave measurement unit 21 detects the pulse (pulse wave) of the user by converting a light amount of infrared light into a photoelectric signal. For example, when the blood flow rate in the vicinity of the wrist of the user increases, the detected value of the pulse wave measuring section 21 rises. Further, when the blood flow rate decreases, the detected value of the pulse wave measuring section 21 falls. In this manner, the pulse wave portion in which the detected value of the pulse wave measurement unit 21 pulsates is generated as a pulse wave signal and is outputted to the processing unit 23.

The communication unit 22 is composed of, for example, a general-purpose wireless communication device having a function of Bluetooth (registered trademark). The communication unit 22 wirelessly communicates with the terminal device 3 via Bluetooth.

The processing unit 23 is composed of, for example, a MCU (Micro Controller Unit) or the like. The processing unit 23 controls the light amount of infrared light emitted from the infrared LED of the pulse wave measurement unit 21, and A/D-converts the pulse wave signal outputted from the pulse wave measurement unit 21 to generate pulse wave data. Then, the processing unit 23 sequentially outputs the pulse wave data to the terminal device 3 via the communication unit 22.

The terminal device 3 is composed of, for example, a general-purpose smartphone, a tablet computer, a personal computer, or the like.

Figure 3:
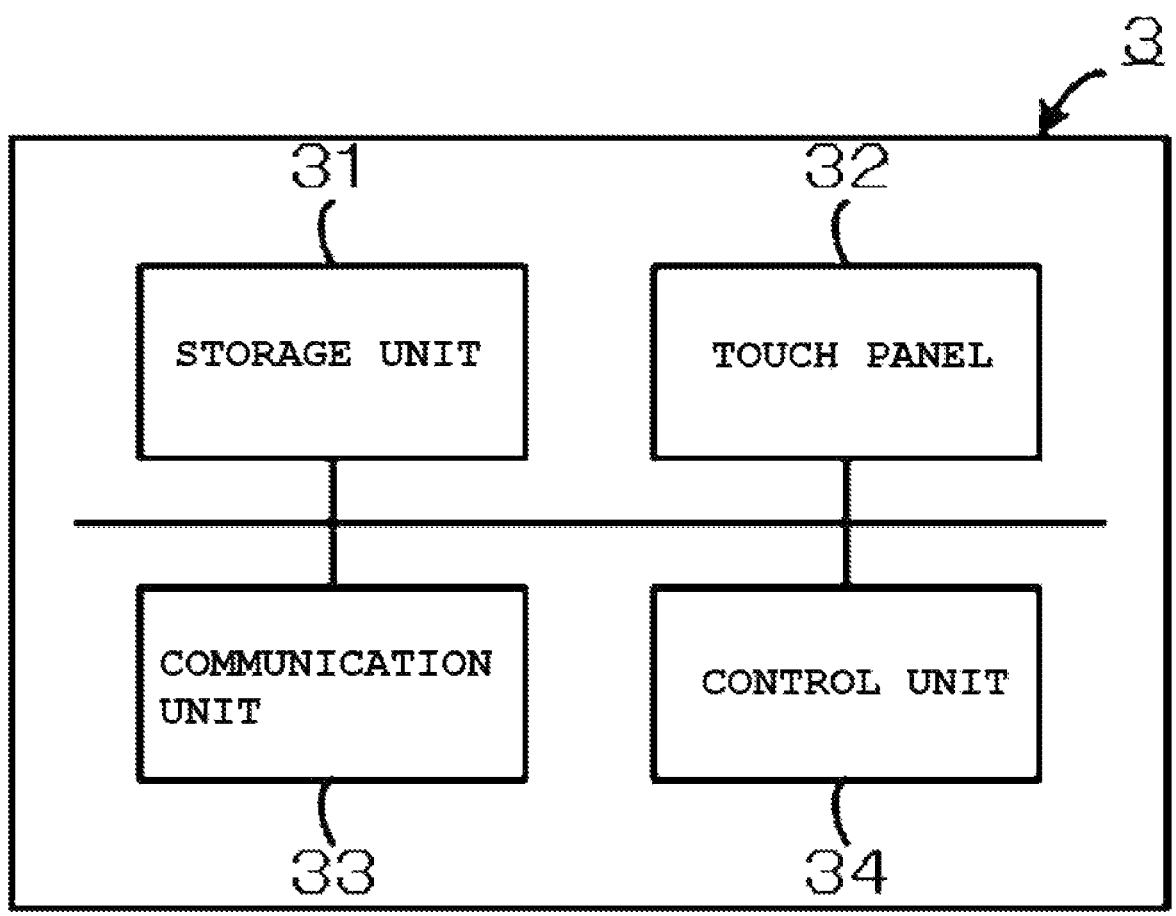
FIG. 3 is a block diagram showing a configuration example of a terminal device.

FIG. 3 is a block diagram showing a configuration example of a terminal device.

As shown in FIG. 3, the terminal device 3 includes a storage unit 31, a touch panel 32, a communication unit 33, and a control unit 34, which are connected to each other via a bus or the like.

The storage unit 31 is composed of, for example, a non-volatile memory such as a general-purpose flash memory or the like. Various application programs are installed in the storage unit 31. In the present embodiment, the various application programs include: an application program for using a web browser and an SNS (Social Networking Service) which is hereinafter referred to as an "SNS app"; an application program for purchasing a parimutuel betting ticket (hereinafter referred to as "betting ticket") which is hereinafter referred to as "betting ticket purchase app"; an application program for treating the gambling addiction which is hereinafter referred to as a "treatment app"; an application program for generating a diary which is hereinafter referred to as "diary generation app"; and the like.

The storage unit 31 is configured to register date and time, the pulse wave data, and log data indicating a usage history of the terminal device 3 in association with each other. In the present embodiment, the usage history of the terminal device 3 includes: a usage history of various application programs; a browsing history (URL (Uniform Resource Locator) of a viewed website and a browsing period, etc.) in a web browser and an SNS app; a purchase history (purchase amount, etc.) of the betting ticket; location information of the terminal device 3; and the like.

The touch panel 32 is composed of, for example, a general-purpose touch panel or the like combining a liquid crystal display device and a pointing device. The touch panel 32 is configured to display various screens and receive various operations by the user. In the present embodiment, the user can tap on an icon of the application program displayed on the touch panel 32 to activate the application program, instruct the purchase of the betting ticket in the betting ticket purchase app, and choose the date in the diary generation app to instruct the generation of a diary. As a result, the diary generated in the diary generation app is displayed on the touch panel 32.

The communication unit 33 is composed of, for example, a general-purpose wireless communication device or the like having a wireless LAN (Local Area Network) function, a Bluetooth function, and a GPS (Global Positioning System) function. The communication unit 33 is configured to wirelessly communicate with the biological information measurement device 2 via Bluetooth. The communication unit 33 is configured to perform wireless communication with the server device 4 via the network N. Furthermore, the communication unit 33 is configured to acquire current location information of the terminal device 3 from a GPS satellite (not shown) via a GPS antenna (not shown). In the present embodiment, the communication unit 33 sequentially receives the pulse wave data from the biological information measurement device 2 via Bluetooth. The communication unit 33 also transmits a diary generation request requesting the generation of a diary to the server device 4 via the network N. Then, the communication unit 33 receives image data for displaying a diary transmitted from the server device 4 via the network N (hereinafter referred to as "diary display data"), image data for displaying a graph expressing an effect of the treatment app (hereinafter referred to as "graph display data"), and the like.

The control unit 34 is composed of, for example, a CPU (Central Processing Unit), a ROM (Read Only Memory), and a RAM (Random Access Memory), and the like. The CPU is configured to control various operations of the terminal device 3 by using the RAM as a work memory and appropriately executing various programs stored in the ROM and the storage unit 31.

In the present embodiment, each time the user browses a website in the web browser and the SNS app, the control unit 34 registers the date and time, the pulse wave data, and the browsing history being the log data in the storage unit 32 in association with each other. Further, each time the user purchases the betting ticket in the betting ticket purchase app, the control unit 34 registers the date and time, the pulse wave data, and the purchase history being the log data in the storage unit 32 in association with each other.

When the user chooses the date in the diary generation app displayed on the touch panel 32 and instructs the generation of a diary, in response thereto, the control unit 34 reads the pulse wave data and the log data of the date and time included in the date chosen by the user from the storage unit 31. Then, the control unit 34 transmits the diary generation request including the pulse wave data and the log data of the date and time read from the storage unit 31 from the communication unit 33 to the server device 4 via the network N. Thereafter, in response to receiving the diary display data transmitted from the server device 4 via the network N with the communication unit 33, the control unit 34 displays the diary on the touch panel 32 based on the diary display data.

In response to receiving the graph display data transmitted from the server device 4 via the network N with the communication unit 33, the control unit 34 displays the graph on the touch panel 32 based on the graph display data.

The server device 4 shown in FIG. 1 is composed of, for example, a general-purpose server computer, a general-purpose database (DataBase; DB), and the like. The server device 4 is the diary generation device for generating a diary of the user of the terminal device 3.

Figure 4:
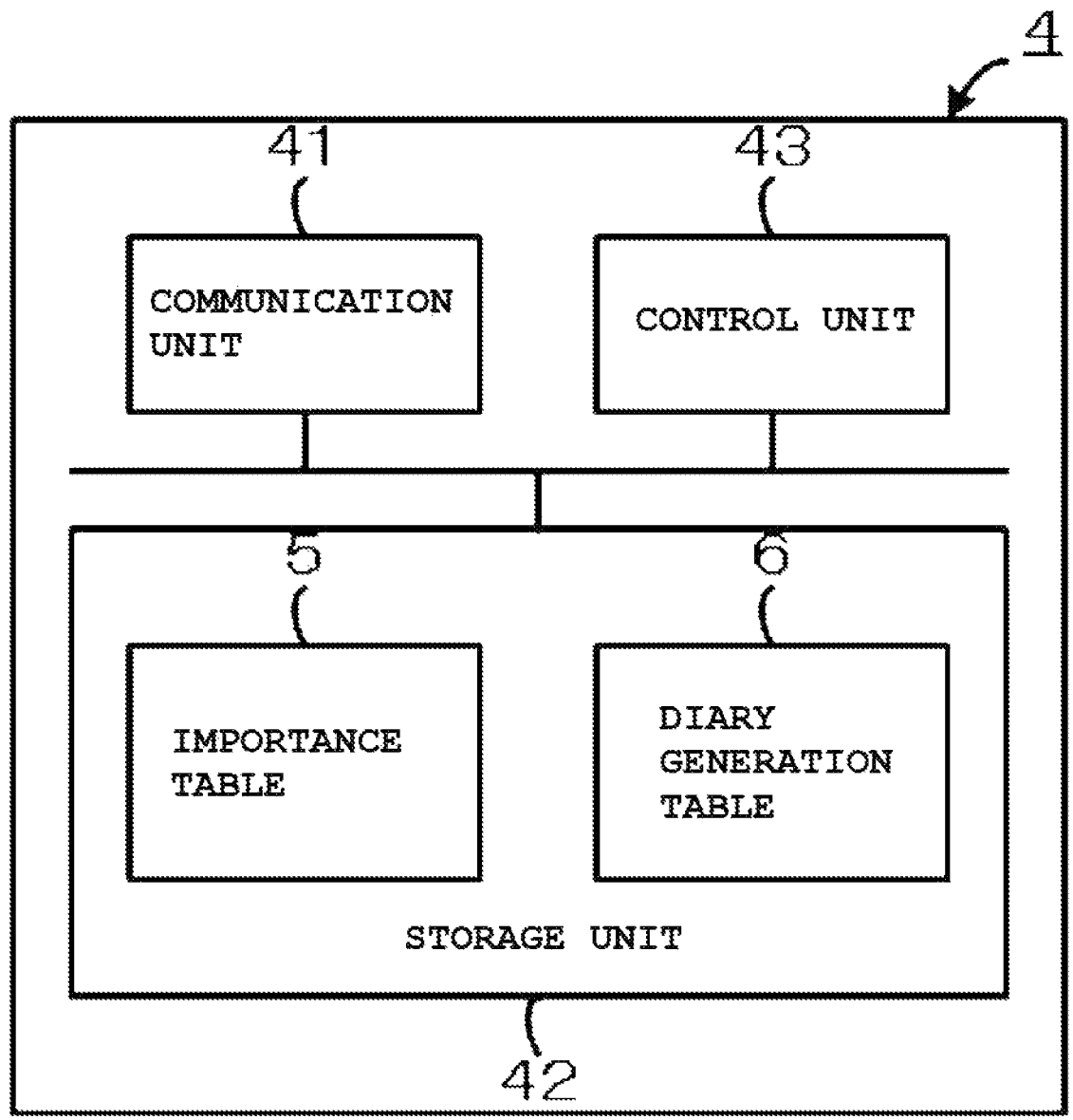
FIG. 4 is a block diagram showing a configuration example of a server device.

FIG. 4 is a block diagram showing a configuration example of a server device.

As shown in FIG. 4, the server device 4 includes a communication unit 41, a storage unit 42, and a control unit 43, which are connected to each other via a bus or the like.

The communication unit 41 is composed of, for example, a NIC (Network Interface Card) or the like. The communication unit 41 is configured to perform wireless communication with the terminal device 3 via the network N. In the present embodiment, the communication unit 41 is configured to receive a diary generation request transmitted from the terminal device 3 via the network N. Further, the communication unit 41 is configured to transmit the diary display data, the graph display data, and the like to the terminal device 3 via the network N.

The storage unit 42 is composed of, for example, a general-purpose hard disk drive or the like. Various application programs are installed in the storage unit 42. In the present embodiment, the various application programs include a diary generation engine and the like for generating a diary. The storage unit 42 includes an importance table 5 and a diary generation table 6.

Figure 5:
FIG. 5 is a diagram showing a configuration example of an importance table.

FIG. 5 is a diagram showing a configuration example of an importance table.

As shown in FIG. 5, the importance table 5 defines the importance of each of activities of the user. In the importance table 5, for example, activities such as "use the betting ticket purchase app", "go to a horse racecourse", and "go to an off-track betting ticket sales office" are set to "high" indicating a high degree of importance. Also, activities such as "use the treatment app" and "browse a horse race-related website" are set to "middle" indicating a moderate degree of importance.

FIG. 6 is a diagram showing a configuration example of a diary generation table.

As shown in FIG. 6, the diary generation table 6 is used as a buffer for generating a diary. For each of the activities of the user, the diary generation table 6 registers the pulse wave at the activity time and the importance of the activity in association with each other according to the time series.

The control unit 43 shown in FIG. 4 is composed of, for example, a CPU, a ROM, a RAM, and the like. The CPU controls various operations of the server device 4 by using the RAM as a work memory and appropriately executing programs and the like stored in the ROM and the storage unit 42.

In the present embodiment, in response to receiving the diary generation request transmitted from the terminal device 3 via the network N with the communication unit 41, the control unit 43 identifies, from the pulse wave data and the log data included in the diary generation request, the activity and the pulse wave of the user at each time in the date chosen by the user, and registers them in association with the diary generation table 6 according to the time series. The control unit 43 can determine a psychological state of the user from the pulse wave indicated by the pulse wave data included in the diary generation request. In the present embodiment, when the pulse wave is less than "100", the control unit 43 determines that the psychological state of the user is in a normal state. Further, when the pulse wave is "100" or more and less than "120", the control unit 43 determines that the psychological state of the user is in a slightly excited state. Furthermore, when the pulse wave is "120" or more, the control unit 43 determines that the psychological state of the user is in an excited state.

In the example shown in FIG. 6, the activity of "use the treatment app" is identified from the usage history of the various application programs in the log data. Further, from the browsing history in the web browser and SNS app, the activities of "browse a website related to the Emperor's Prize", "browse a horse race live broadcast", and "browse a website related to the Queen Elizabeth Cup (11/15)" are identified. Furthermore, from the location information of the terminal device 3, the activities of "go to an off-track betting ticket sales office", "go to a bar" and "go home" are identified.

The control unit 43 shown in FIG. 4 determines the importance of each identified activity from the pulse wave (the psychological state of the user) at the activity time and the importance table 5, and registers it in the diary generation table 6 in association with the activity. Specifically, among the identified activities, the control unit 43 determines the activity in which the importance is set to "high" in the importance table 5, or the activity in which the pulse wave is "100" or more and the psychological state of the user is the slightly excited state or the excited state as the "high" importance activity. On the other hand, among the identified activities, the control unit 43 determines the activity in which the importance is set to "middle" in the importance table 5, the pulse wave is less than "100", and the psychological state of the user is in the normal state as the "middle" importance activity. On the other hand, among the identified activities, the control unit 43 determines the activity in which the importance is not set to "high" or "middle" in the importance table 5, the pulse wave is less than "100", and the psychological state of the user is in the normal state as the "low" importance activity indicating that the importance is low.

In the example shown in FIG. 6, the activity of "go to an off-track betting ticket sales office" is determined as the "high" importance activity, since the importance thereof is set to "high" in the importance table 5. In addition, the activities of "browse a horse race-related website" such as "browse a website related to the Emperor's Prize", "browse a horse race live broadcast", and "browse a website related to the Queen Elizabeth Cup (11/15)" are set to "middle" in the importance table 5. However, since each of the pulse waves at the activity time is "100" or more and the psychological state of the user is the slightly excited state or the excited state, these activities are determined as the "high" importance activities. On the other hand, the activity of "use the treatment app" is determined as the "middle" importance activity. This is because the importance thereof is set to "middle" in the importance table 5, each of the pulse waves at the activity time is less than "100", and the psychological state of the user is in the normal state. On the other hand, for the activities of "go to a bar" and "go home", the importance thereof is not set to "high" or "middle" in the importance table 5. Further, each of the pulse waves at the activity time is less than "100". Furthermore, the psychological state of the user is in the normal state. Accordingly, such activities are determined as the "low" importance activities.

The control unit 43 shown in FIG. 4 determines the activities to be described in the diary among the identified activities depending on the importance thereof. That is, the control unit 43 determines whether or not each of the activities of the user is described in the diary at a different rate depending on the importance of the activity. Specifically, the control unit 43 determines that the "high" importance activity is described in the diary at a first ratio ("approximately 100%" in the present embodiment). On the other hand, the control unit 43 determines that the "middle" importance activity is described in the diary at a second ratio ("approximately 50%" in the present embodiment). On the other hand, the control unit 43 determines that the activity being not "high" or "middle", that is, the "low" importance activity is described in the diary at a third ratio ("approximately 25%" in the present embodiment). It should be noted that the first to third ratios are optional. For example, all ratios may be "approximately 33%".

Subsequently, the control unit 43 determines the style of writing each activity to be described in the diary depending on the importance and the pulse wave at the activity time, and generates sentences, each of which expresses the activity, in accordance with a predetermined rule. That is, the control unit 43 generates each of the sentences, each of which expresses the activity of the user, in a different style depending on the importance of the activity and the psychological state of the user. Specifically, if the importance of the activity is "middle" or "low", the control unit 43 generates the sentence in a normal style such as " . . . did . . . " or " . . . was . . . ". Further, if the importance of the activity is "high", but the pulse wave at the activity time is less than "100" and the psychological state of the user is in the normal state, the control unit 43 generates the sentence in the normal style such as " . . . did . . . " or " . . . was . . . " in the same way as the "middle" or "low" importance activity. On the other hand, if the importance of the activity is "high", the pulse wave at the activity time is "100" or more and less than "120" and the psychological state of the user is the slightly excited state, the control unit 43 generates the sentence in a style expressing the slightly excited state such as " . . . did it!", " . . . was. . . !" or the like. On the other hand, if the importance of the activity is "high", the pulse wave at the activity time is "120" or more and the psychological state of the user is the excited state, the control unit 43 generates the sentence in a style expressing the excited state such as " . . . did it, man!", " . . . was . . . , man!" or the like.

In the example shown in FIG. 6, for the first activity of "use the treatment app" with "middle" importance, the sentence is generated in the normal style such as "I used the treatment app again at lunchtime today, and thus I was able to continue for 151 days." in order to notify the user of the duration of the treatment app in accordance with a predetermined rule. Further, for the activity of "go home", and the activity of "use the treatment app" with "middle" importance other than the first activity of "use the treatment app", each of the sentences is generated in the normal style such as "I went home and used the treatment app." without the notification to the user regarding the duration of the treatment app in accordance with the predetermined rule.

On the other hand, under the condition that the "high" importance activities are "browse a website related to the Emperor's Prize", "go to an off-track betting ticket sales office" and "browse a horse race live broadcast", if the pulse wave at each activity time is "120" or more and the psychological state of the user is the excited state, the sentences are generated in the style expressing the excited state such as "I can't stop thinking about the Emperor's Prize, man!", "I bought the betting ticket at the off-track betting ticket sales office, man!", "the result was 4th, man!" and the like in accordance with the predetermined rule, respectively. On the other hand, under the condition that the "high" importance activity is "browse a website related to the Queen Elizabeth Cup (11/15)", if the pulse wave at the activity time is "100" or more and less than "120" and the psychological state of the user is the slightly excited state, the sentence is generated in the style expressing the slightly excited state such as "I am curious about the horses running in the Queen Elizabeth Cup!" and the like in accordance with the predetermined rule.

It should be noted that the control unit 43 may determine a tone of the sentence and the like in addition to or instead of the style of writing each activity to be described in the diary in accordance with the importance thereof and the pulse wave at the activity time.

Then, the control unit 43 describes the sentences, which respectively express the generated activities, in a predetermined order ("time series" in the present embodiment), and generates a diary including the sentences, each expressing the activity as shown in FIG. 7. At this time, the control unit 43 may set the ratio to the entire diary for each degree of importance. That is, the control unit 43 may change the ratio of the sentence expressing the activity of the user to the diary depending on the importance of the activity. For example, the control unit 43 may set the number of characters of the sentence expressing the "high" importance activity to approximately 60% of the total number of characters in the entire diary. Further, the control unit 43 may set the number of characters of the sentence expressing the "middle" importance activity to approximately 30% of the total number of characters in the entire diary. Furthermore, the control unit 43 may set the number of characters of the sentence expressing the "low" importance activity to approximately 10% of the total number of characters in the entire diary. Alternatively, the control unit 43 may set the number of characters of each sentence expressing each importance activity to approximately 33%.

Subsequently, the control unit 43 generates the diary display data which is the image data for displaying the generated diary. Then, the control unit 43 transmits the generated diary display data from the communication unit 41 to the terminal device 3 via the network N.

Figure 8:
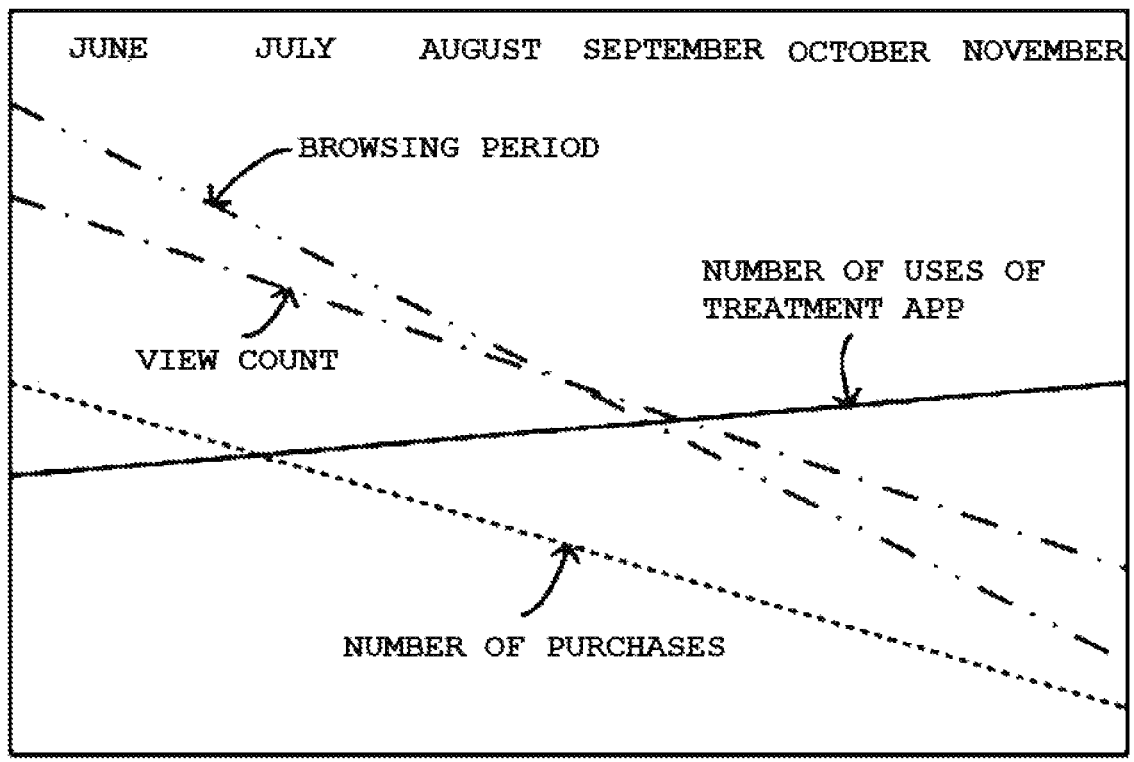
FIG. 8 is a diagram illustrating a graph.

The control unit 43 also specifies, from the log data included in the diary generation request, the number of purchases of the betting ticket, the view count and the browsing period of the horse race-related website, and the number of uses of the treatment app in a predetermined period ("one month" in the present embodiment). It should be noted that the predetermined period may be one day, one week, or the like, and is arbitrary. Thereafter, the control unit 43 graphs the number of purchases of the betting ticket, the view count and the browsing period of the horse race-related website, and the number of uses of the treatment app for each predetermined period to generate a graph expressing an effect of the treatment app as shown in FIG. 8. Then, the control unit 43 generates image data for displaying the graph and transmits the image data from the communication unit 41 to the terminal device 3 via the network N.

Next, a diary generation process executed by the diary generation system 1 including the above-described configurations will be described with reference to the drawings.

After the user chooses a date (e.g., Nov. 1, 2020, when the Emperor's Prize is held) in the diary generation app displayed on the touch panel 32 of the terminal device 3, in response to an instruction to generate a diary, the diary generation system 1 starts the diary generation process.

Figure 9:
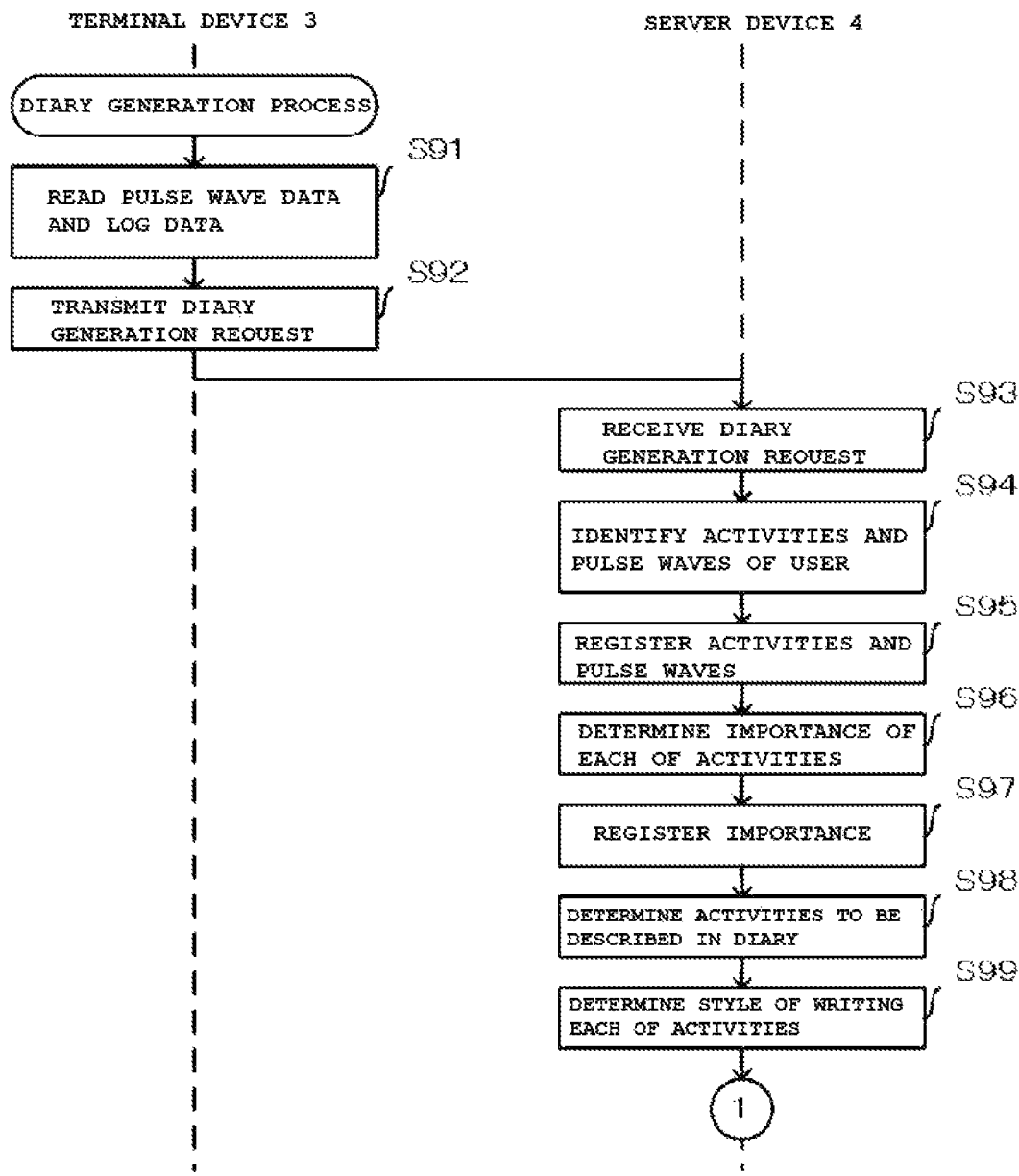
FIG. 9 is a flow chart showing details of a diary generation process.
Figure 10:
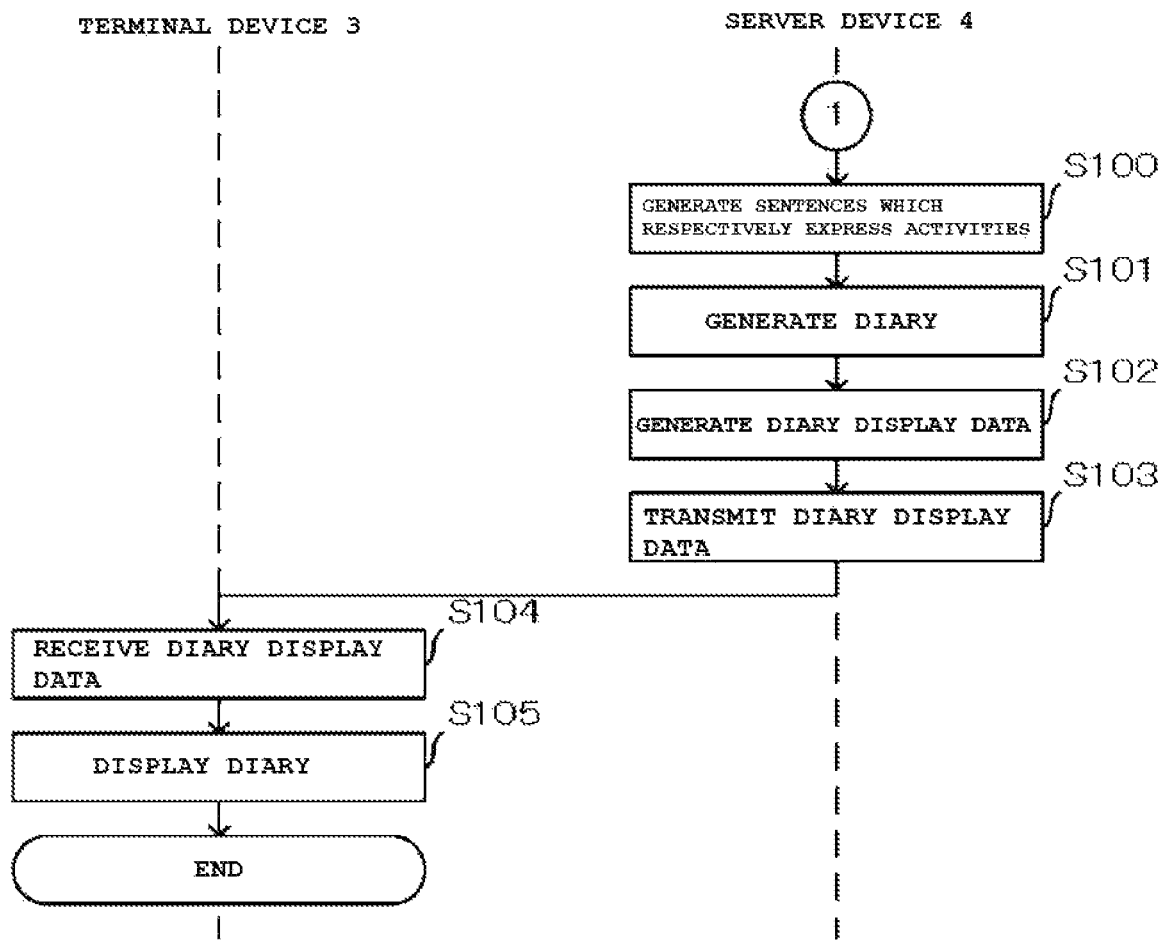
FIG. 10 is a flow chart of a continuation of the diary generation process.

Each of FIGS. 9 and 10 is a flow chart showing details of a diary generation process.

In the diary generation process shown in FIGS. 9 and 10, first, the control unit 34 of the terminal device 3 reads the pulse wave data and the log data of the date and time included in the date chosen by the user from the storage unit 31 (step S91 shown in FIG. 9).

Then, the control unit 34 transmits the diary generation request including the pulse wave data and the log data of the date and time read from the storage unit 31 from the communication unit 33 to the server device 4 via the network N (step S92).

The control unit 43 of the server device 4 receives the diary generation request transmitted from the terminal device 3 via the network N with the communication unit 41 (Step S93). In response thereto, the control unit 43 identifies, from the pulse wave data and the log data included in the diary generation request, the activity and the pulse wave of the user at each time on the date chosen by the user (Step S94), and registers them in association with the diary generation table 6 according to the time series (Step S95).

Then, the control unit 43 determines the importance of each identified activity from the pulse wave at the activity time and the importance table 5 (Step S96), and registers it in the diary generation table 6 in association with the activity (Step S97).

Next, the control unit 43 determines, among the identified activities, the activities to be described in the diary depending on the importance thereof (step S98).

Subsequently, the control unit 43 determines the style of writing each activity to be described in the diary depending on the importance and the pulse wave at the activity time (Step S99), and generates the sentences which respectively express the activities (Step S100 shown in FIG. 10).

Then, the control unit 43 describes, in time series, the sentences expressing the activities generated in step S100, and generates a diary including the sentences expressing the activities (Step S101).

Subsequently, the control unit 43 generates the diary display data which is the image data for displaying the diary generated in Step S101 (Step S102).

Then, the control unit 43 transmits the diary display data generated in the step S102 from the communication unit 41 to the terminal device 3 via the network N (step S103).

Thereafter, the control unit 34 of the terminal device 3 receives the diary display data transmitted from the server device 4 via the network N with the communication unit 33 (Step S104). In response thereto, the control unit 34 displays the diary shown in FIG. 7 on the touch panel 32 based on the diary display data (Step S105), and then ends the diary positive generation process.

As explained above, the diary generation system 1 according to the present embodiment includes: the biological information measurement device 2 for measuring the biological information of the user; the terminal device 3; and the server device 4 which is the diary generation device configured to be connected to the terminal device 3 via the network N and generate a diary of the user of the terminal device 3. The terminal device 3 transmits the diary generation request including the usage history of the terminal device 3 and the biological information of the user obtained by the biological information measurement device 2 to the server device 4 via the network N.

In response to receiving the diary generation request transmitted from the terminal device 3 via the network N, the server device 4 identifies the activities of the user from the usage history of the terminal device 3 included in the diary generation request. The server device 4 also specifies the psychological state of the user based on the pulse wave data which is the biological information of the user included in the diary generation request. The server device 4 includes the importance table 5 which defines the importance of each of the activities of the user. The server device 4 specifies the importance of each of the activities of the user identified from the usage history of the terminal device 3 based on the importance table 5. Then, the server device 4 determines whether or not the activity of the user is described in the diary at a different rate depending on the importance of the activity. In accordance with the predetermined rule, the server device 4 also generates each of the sentences, each of which expresses the activity of the user, in the different style depending on the importance of the activity and the psychological state of the user. The server device 4 then describes the sentences in a predetermined order to generate the diary, and causes the terminal device 3 to display the diary via the network N. It should be noted that the server device 4 may change the ratio of the sentence expressing the activity of the user to the diary depending on the importance of the activity.

Thus, according to the diary generation system 1 according to the present embodiment, it is possible to identify the activities of the user from the usage history of the terminal device 3, specify the psychological state of the user from the biological information of the user, and easily generate the diary from the identified activities and the specified psychological state of the user.

The present invention is not limited to the above embodiment, and various modifications and applications thereof are possible. The modifications of the above-described embodiment applicable to the present invention will now be described.

In the above embodiment, the diary is described as being generated by the server device 4. However, the present invention is not limited thereto, and the terminal device 3 may generate the diary. That is, the terminal device 3 itself may be the diary generation device according to the present invention.

In the above embodiment, the diary is described as being for the treatment of the gambling addiction. However, the present invention is not limited thereto, and the purpose of diary is arbitrary.

In the above embodiment, the gambling addiction is described in an example as a treatment subject. However, the present invention is not limited thereto, and the treatment subject is arbitrary as long as the diary is effective for the treatment. The treatment subject may be MCI, dementia, developmental disorder and the like. Alternatively, the treatment subject may be internal medicine diseases such as hypertension, chronic pain, cancer and the like.

In the above embodiment, the biological information is described as being the pulse wave of the user. However, the present invention is not limited thereto, and the biological information is arbitrary as long as the psychological state of the user can be specified. For example, the biological information may be a brain wave, a pupil change, a blood pressure, a body temperature of the user. The biological information may be one of the pulse wave, the brain wave, the pupil change, the blood pressure and the body temperature, and may be a combination thereof.

The programs executed by the CPUs of the control units 34 and 43 and the processing unit 23 in the above embodiment is described as being preliminarily stored in the ROM and the storage units 31 and 42. However, the present invention is not limited thereto. The programs for executing the above processes may be applied to an existing general-purpose computer to function as the biological information measurement device 2, the terminal device 3 and the server device 4 according to the above embodiment.

The method for providing such programs is arbitrary. For example, the programs may be stored in a computer-readable recording medium (flexible disk, CD (Compact Disc)-ROM, DVD (Digital Versatile Disc)-ROM, etc.), and distributed. Further, the programs may be stored in a storage on a network such as the Internet, and provided by downloading the programs.

Further, when the above processes are executed by sharing the responsibility between an OS (Operating System) with an application program or by cooperation with the OS and the application program, only the application program may be stored in the recording medium or the storage. It is also possible to superimpose a program on a carrier wave and distribute it via a network. For example, the program may be posted to a bulletin board system (BBS) on the network, and the program may be distributed via the network. Then, the above-described processing may be executed by starting the program and executing the program in the same manner as the other application programs under the control of the OS.

It should be noted that the present invention is capable of various embodiments and modifications without departing from the broadly defined spirit and the scope of the present invention. Also, the above-described embodiment is intended to illustrate one embodiment of the invention and is not intended to limit the scope of the present invention.

EXPLANATION OF REFERENCE NUMERALS

1: Diary Generation System
2: Biological Information Measurement Device
3: Terminal Device
4: Server Device (Diary Generation Device)
31, 42: Storage Unit
32: Touch Panel
22, 33, 41: Communication Unit
34, 43: Control Unit
23: Processing Unit
5: Importance Table
6: Diary Generation Table

What is claimed is:

1. A diary generation device (4) being configured to identify an activity of a user of a terminal device (3) from a usage history of the terminal device (3),
specify a psychological state of the user from biological information of the user obtained by a biological information measurement device (2) for measuring the biological information of the user,
generate sentences, each of the sentences express the activity of the user, in a different style depending on the psychological state of the user, in accordance with a predetermined rule, and
describe the sentences in a predetermined order to generate a diary;
wherein the diary generation device (4) comprises a communication unit composed of a network interface card, a storage unit comprising a hard disk drive and a control unit composed of a CPU (central processing unit), a ROM (read only memory), and a RAM (random access memory);
wherein the terminal device (3) comprises a storage unit having a non-volatile memory, a touch panel comprising a liquid crystal display device and a pointing device, a communication unit comprising a general-purpose wireless communication device having a wireless LAN (Local Area Network) function, a bluetooth function, and a GPS (Global Positioning System) function, and a control unit comprising a CPU (central processing unit), a ROM (read only memory), and a RAM (random access memory); and wherein the biological information measurement device (2) comprises a pulse wave measurement unit having an infrared light emitting diode, a communication unit comprising a general-purpose wireless communication device and a processing unit comprising a micro controller unit.

2. The diary generation device (4) according to claim 1, comprising an importance table (5) which defines importance of each of the activities of the user, wherein the diary generation device (4) is configured to identify the importance of the activity of the user identified from the usage history of the terminal device (3) based on the importance table (5), and wherein the diary generation device (4) is configured to generate each of the sentences, each of which expresses the activity of the user, in a different style depending on the importance of the activity and the psychological state of the user.

3. The diary generation device (4) according to claim 2, wherein the diary generation device (4) is configured to determine whether or not to describe the activity of the user in the diary at a different rate depending on the importance of the activity.

4. The diary generation device (4) according to claim 2, wherein the diary generation device (4) is configured to change a ratio of each of the sentences, each of which expresses the activity of the user, to the diary depending on the importance of the activity.

5. The diary generation device (4) according to claim 1, wherein the sentences express the activity of the user, in a normal style when a value indicated by the biological information of the user obtained by the biological information measurement device (2) is below a predetermined range, wherein the sentences express the activity of the user, in a style expressing a slightly excited state when a value indicated by the biological information is within the predetermined range, and wherein the sentences express the activity of the user, in a style expressing an excited state when a value indicated by the biological information is beyond the predetermined range.

6. The diary generation device (4) according to claim 5, comprising an importance table (5) which defines importance of each of the activities of the user, wherein the diary generation device (4) is configured to identify the importance of the activity of the user identified from the usage history of the terminal device (3) based on the importance table (5), wherein the sentences express the activity of the user, in the normal style when the importance of the activity of the user is not high, and wherein when the importance of the activity of the user is high, the sentences express the activity of the user, in the normal style when the value indicated by the biological information is below the predetermined range, the sentences express the activity of the user, in a style expressing a slightly excited state when a value indicated by the biological information is within the predetermined range, the sentences express the activity of the user, in a style expressing an excited state when a value indicated by the biological information is beyond the predetermined range.

* * * * *